Feb. 14, 1956  P. SCHLUMBOHM  2,734,588
AUTOMOBILE WITH HEAT DISSIPATING AIR DUCT
Filed June 24, 1950  4 Sheets-Sheet 1

INVENTOR.

Feb. 14, 1956 P. SCHLUMBOHM 2,734,588
AUTOMOBILE WITH HEAT DISSIPATING AIR DUCT
Filed June 24, 1950 4 Sheets-Sheet 2
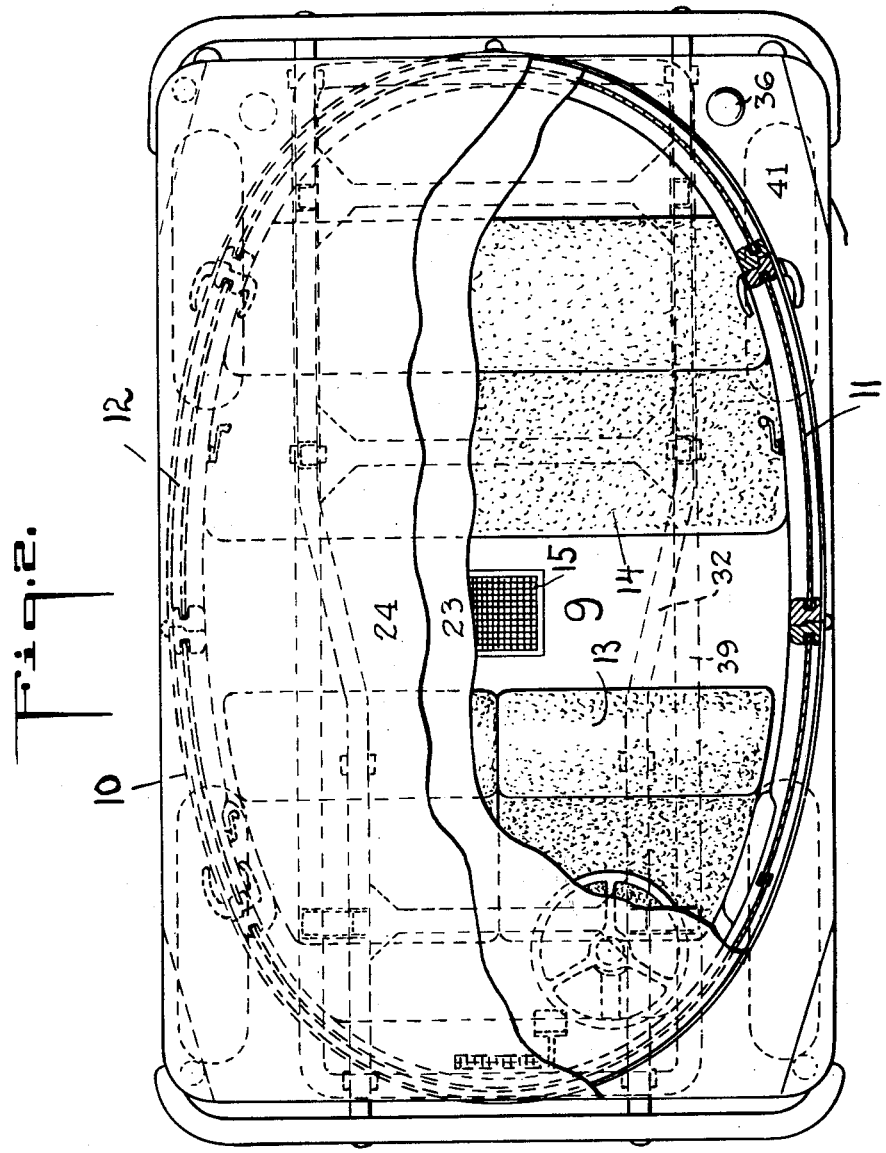
INVENTOR.

Feb. 14, 1956  P. SCHLUMBOHM  2,734,588
AUTOMOBILE WITH HEAT DISSIPATING AIR DUCT
Filed June 24, 1950  4 Sheets-Sheet 3
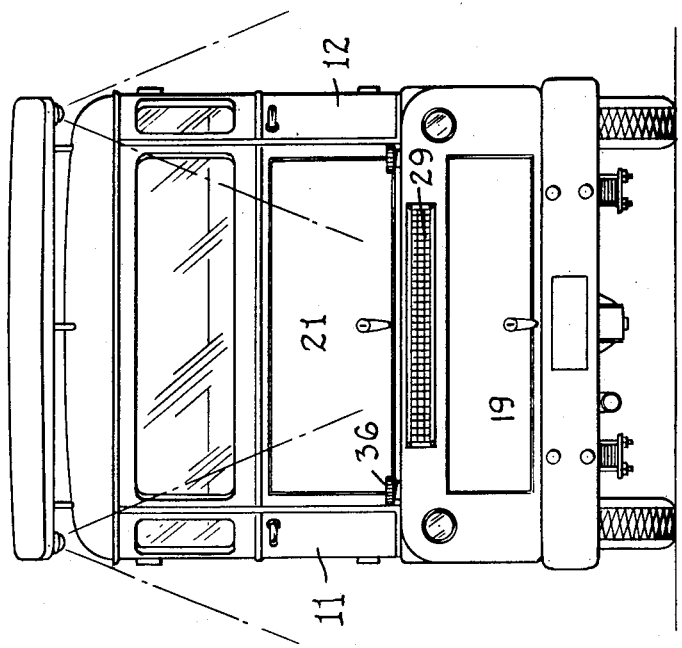
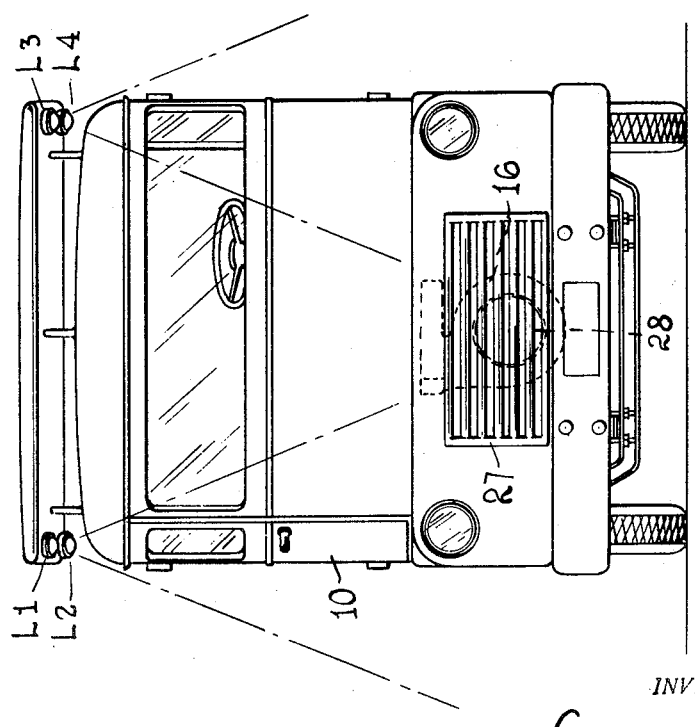
INVENTOR.

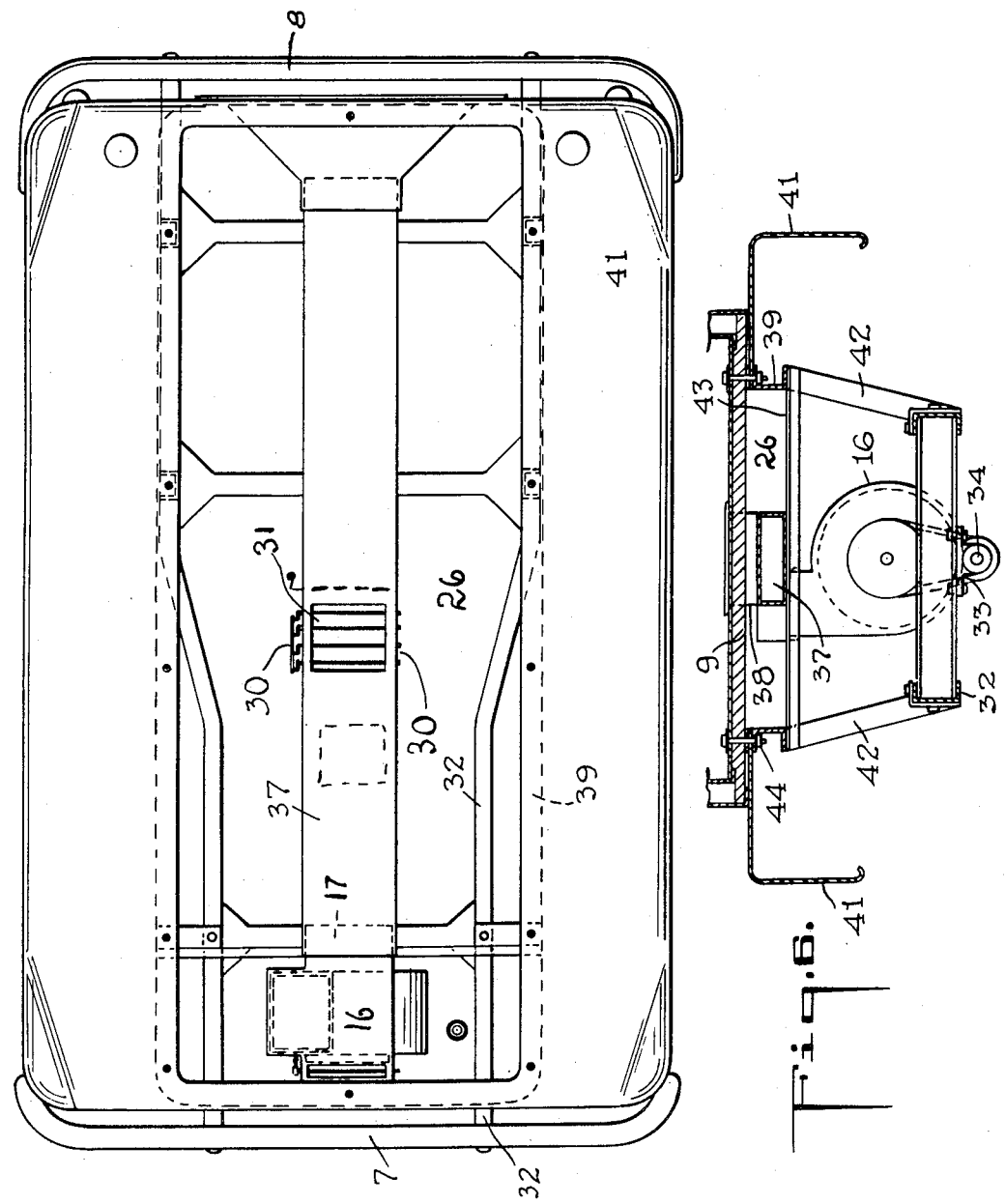

2,734,588
AUTOMOBILE WITH HEAT DISSIPATING AIR DUCT

Peter Schlumbohm, New York, N. Y.

Application June 24, 1950, Serial No. 170,192

2 Claims. (Cl. 180—58)

The present invention relates to automobiles, and more specifically it refers to the "family-car," in contrast to trucks or buses.

The new family car of my invention has the following features:

(1) The overall length is only 60% of the length of a conventional automobile with the same motor power and the same passenger space.

(2) The passenger space is arranged above the motor space and occupies the entire wheel base.

(3) The motor is arranged between the front and rear axles, as low as road clearance allows.

(4) Two frames are provided one above the other. The lower frame has conventional structure but is shortened to substantially the length of the wheel base. The upper frame, also of wheel base length is spaced from the lower frame and carries the body for say six passengers like an upper deck.

(5) Insulating means and an air channel for forced draft prevent heat from the motor section from annoying the passengers.

(6 The streamlining is that of a ship's funnel. The walls and windows of the passenger compartment are vertically rising from a floor wall of oval shape. The roof is plane and pitched downward toward the rear end for draining rain and snow.

(7) Crash safety: The passenger space—due to its high level above the road—is rather safe in a crash.

(8) Visibility for driver and passengers is excellent.

(9) Maneuverability: This shorter car is a boon to traffic. Parking is simple, and U-turns are simple.

(10) Accessibility for repairs: The mechanic is not separated from the motor by a wheel: he stands between the front wheel and the rear wheel. For important repairs and replacement, the entire passenger compartment can be disconnected from the upper frame and lifted off as an entity by crane.

The invention is illustrated, by way of example, in Fig. 1 to Fig. 6 of the accompanying drawings.

Fig. 2 is a top view of Fig. 1, partly broken away and partly in horizontal section.

Figure 1:
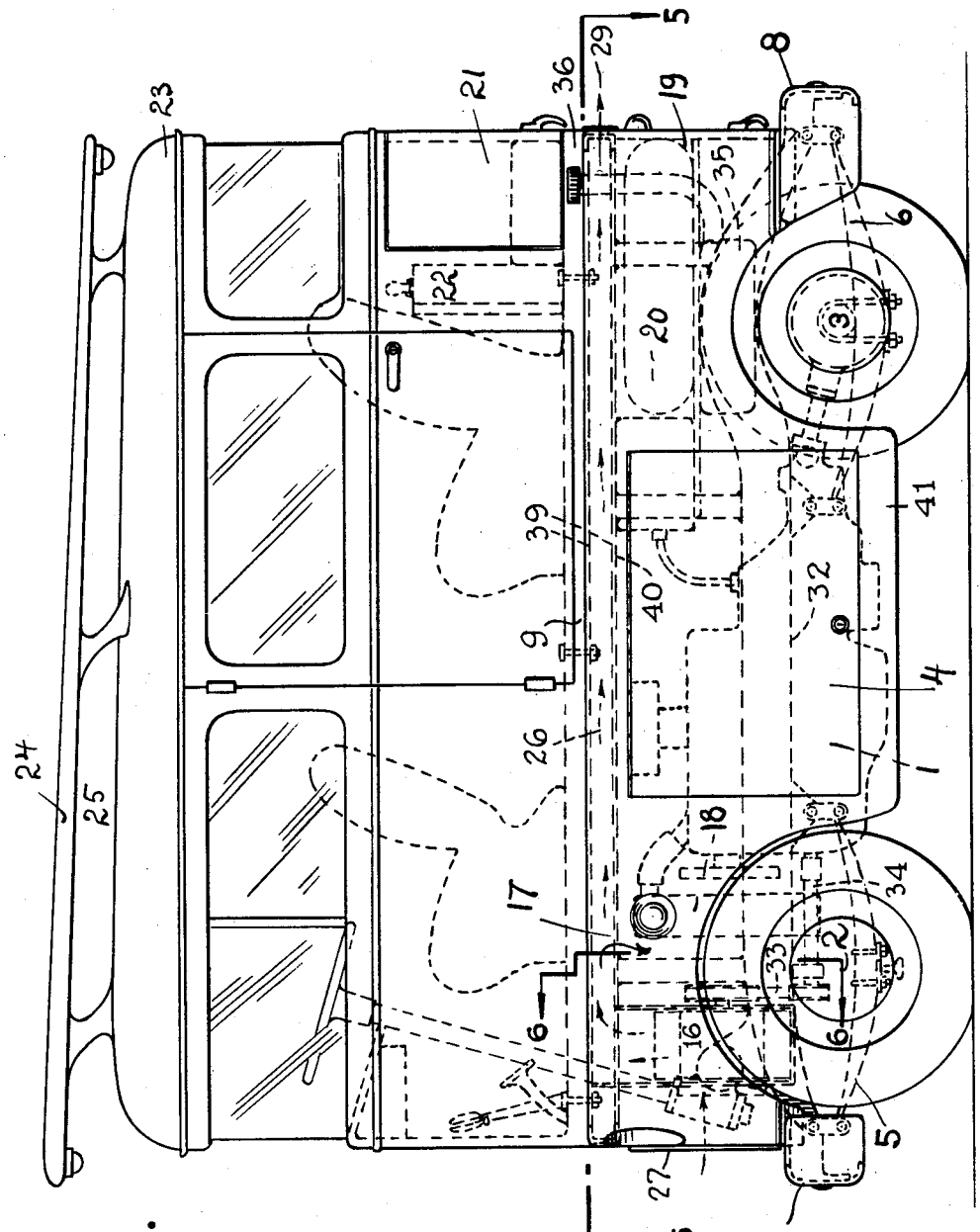
Fig. 1 is a side view of a passenger car, showing the seats, the air-duct and the mechanism in dotted lines.

Fig. 3 is a front view of the passenger car shown in Fig. 1, showing the front intake of the air duct. An air blower is indicated in dotted lines. Also indicated are the beams of light directed downward from the roof lamps.

Fig. 4 is a rear view of the passenger car shown in Fig. 1, showing the exhaust grill of the air duct.

Fig. 5 illustrates as a top view a section along 5—5 of Fig. 1, omitting parts in order to show details of the two superposed frames.

Fig. 6 is a vertical section along the lines 6—6 of Fig. 1, showing partly in cross section and partly in view details of Fig. 1.

The drawings show that it is possible to build a car with a short wheel base length and that it is further possible to limit the length of the car substantially to this wheel base length without sacrificing space for the motor or space for the passengers computed on a comparable car.

In Fig. 1 the motor 1 is arranged between the front axle 2 and the rear axle 3. I am showing in this example wheels of standard diameter. However, it would be advantageous to apply larger wheels so that the level of the axle will be higher above the road. This will lower the center of gravity of the car with reference to the axles.

The motor is accessible by panel 4. Elliptic springs 5, 6 dictate the overall length of the lower frame 32, which is supplemented by front bumper 7 and rear bumper 8.

In front of the motor 1 is its radiator 18 and in front of the radiator is a centrifugal blower 16. The blower 16 is driven by a belt 33 which takes off from an extension 34 of the crank shaft of the motor. Behind the motor, over the rear axle, is space for a gasoline tank 35 closed by the tank cap 36 and for a compartment 19 for a spare tire 20. The motor compartment is covered by a top wall 40.

Above it is an unrestricted air duct space 26, which extends under the floor wall 9 of the passenger compartment over the entire length of the car and over a substantial part of its width. As shown in Fig. 3 and Fig. 4, this air duct 26 has an air intake 27 in the front wall of the car and an air outlet 29 in the rear wall of the car.

During driving, air will be rammed into air intake 27, pass through duct 26 and leave through grill 29.

However, in order to provide heat dissipation during the standstill or slow motion of the car, forced draft is provided by a powerful blower 16.

The air intake 28 of the blower receives air through air intake 27 and the outlet of the blower is equipped with a conventional pressure duct 37 from which the compressed air can be distributed by conventional means, such as louvres 30 or a gate 31, to enter the general air channel 26 for cooling purposes to protect the passenger space against the heat from the motor space, or can be directed through branch duct 17 against radiator 18 or through a branch duct 38 through grill 15 into the passenger compartment.

I allot 5 hp. to driving the blower 16. This gives about 2,000 cu. ft. per minute at about 4" water column pressure. This is adequate for a six passenger car.

The provision of an unrestricted air channel 26 is greatly facilitated by a second frame 39, on which the floor wall 9 of the passenger compartment is mounted. Fig. 6 shows the details of this double frame structure. This upper frame 39 also carries the skirt 41 of the car. The upper frame 39 is supported by the base frame 32 by means of uprights 42. Horizontal cross beams 43 support panels 40, which cover the motor compartment.

The provision of the upper frame 39 makes it possible to mount on it a passenger compartment which can be lifted off its upper frame as an entity by unfastening bolts 44.

As shown in Fig. 2 this passenger compartment has a floor wall 9 of oval shape. From this floor wall, side walls rise vertically. One front door 10 and two rear doors 11, 12 are provided. The front seats 13 will seat three passengers and the rear seats 14 also will seat three passengers. By omitting the left front door the driver enjoys a view unrestricted by any posts on the left side. A luggage compartment 21 is shown in Fig. 1 as providing space for luggage 22. Making the walls of the passenger space vertical and providing for the passenger compartment the streamlined profile of a ship's funnel should make manufacturing simpler than providing the intricate curved metal sheets now used for streamlined passenger cars.

The roof 23 of the passenger compartment is pitched downward toward the rear end of the car. A false roof 24 is provided to reflect the radiant sun heat. The air channel 25 between roof 23 and the false roof 24 allows air to cool both the roof 23 and the false roof 24.

Following my invention I designed the false roof 24 with rectangular contours so that the corners of the false roof 24 overhang the oval passenger compartment. This allows to install downwardly direct lights L1, L2, L3 and L4, which facilitates parking.

It is a matter of detail to arrange for some recessed steps in the lower side walls of the car to allow passengers to step up into the passenger compartment.

I realize, that this car of my invention is contrary to all present trends towards longer and longer wheel base and lower and lower height. I believe that progress in tire design eliminates the necessity of a long wheel base as precondition for a smooth ride. I also believe that a sane speed limit of 50 M. P. H. does not call for aping airplane streamlining in cars.

In spite of limiting the speed to 50 M. P. H. a strong motor is still required for great acceleration, and the heavy weight of these modern motors—arranged low between the axles—allows to build the car high.

Having now described the nature of my invention and shown by way of example the manner in which it may be performed, I claim as my invention:

1. An automobile of the family car type, said automobile comprising two separate structural sections, both of an overall length substantially equal to the wheelbase length and of an overall width substantially equal to the width of the automobile and being superposed one above the other, the lower section comprising the axles, the wheels and the motor, said motor being located between the axles, and the upper section comprising the passenger compartment, a horizontal air duct having vertical side walls and extending over a length corresponding to the length of said two structural sections and over a substantial part of their width, said two sections being vertically spaced from each other by and to the extent of the vertical side walls of said horizontal air duct, and means communicating with said air duct for directing air through said airduct, whereby heat emanating from the motor in the lower section and passing upwardly toward the passenger compartment of the upper section will be dissipated by the air directed through said air duct.

2. An automobile of the family car type, said automobile comprising two separate structural sections, said two sections having substantially the same overall length and the same overall width, said two sections being superposed one above the other, said lower section including the axles, the wheels and the motor, and comprising two frames of substantially the same dimensions in length and width, said two frames being superposed one above the other, the lower frame being attached to the axles and carrying the motor between the axles, the upper frame extending horizontally at a level above the highest part of the motor and being supported by uprights mounted on the lower frame, said upper section comprising a passenger compartment including a floor wall and being mounted on said upper frame, an air duct extending horizontally above the highest part of the motor and having a top wall and side walls, said top wall being defined by a substantial part of the floor wall of the passenger compartment and said side walls being defined by said upper frame, and means communicating with said air duct for directing air therethrough, whereby heat emanating from the motor in the lower section and passing upwardly toward the passenger compartment will be dissipated by the air directed through said air duct.

References Cited in the file of this patent

UNITED STATES PATENTS

| | | |
|---|---|---|
| 766,191 | Moakler | Aug. 2, 1904 |
| 1,024,438 | Cooke | Apr. 23, 1912 |
| 1,217,702 | Bulley | Feb. 27, 1917 |
| 1,648,505 | Persu | Nov. 8, 1927 |
| 1,887,724 | Sieweck | Nov. 15, 1932 |
| 1,934,385 | Strauss | Nov. 7, 1933 |
| 2,231,293 | Norman | Feb. 11, 1941 |
| 2,355,103 | Otto et al. | Aug. 8, 1944 |
| 2,361,924 | Boynton | Nov. 7, 1944 |
| 2,418,294 | Flogaus et al. | Apr. 1, 1947 |